No. 743,003. PATENTED NOV. 3, 1903.
N. LAMB.
BOLT CUTTER.
APPLICATION FILED MAR. 4, 1903.
NO MODEL.
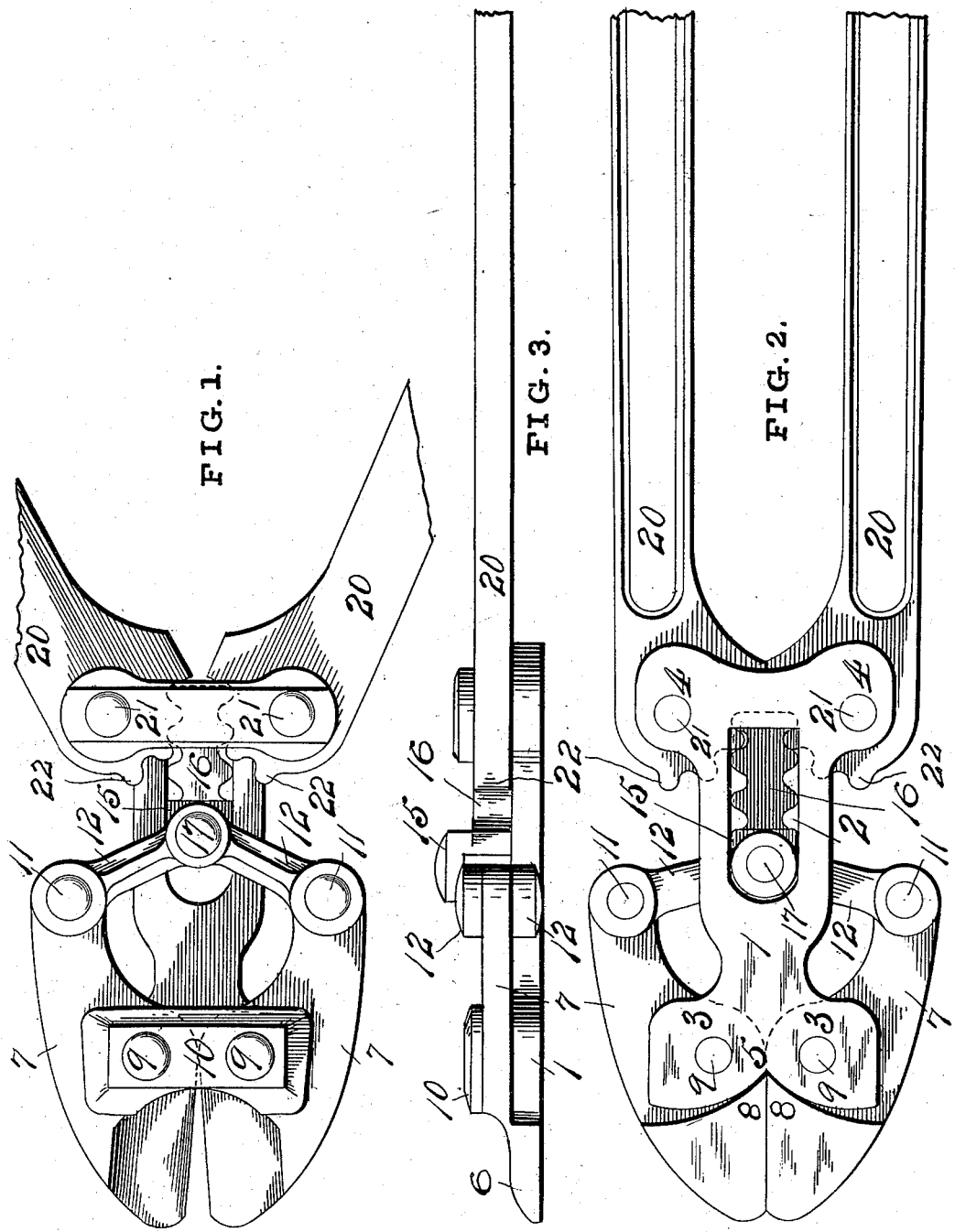
Witnesses
Chas. K. Davies.
M. E. Brown.
Inventor
Newton Lamb
by W. H. Bartlett
Attorney.

No. 743,003. Patented November 3, 1903.

UNITED STATES PATENT OFFICE.

NEWTON LAMB, OF YREKA, CALIFORNIA.

BOLT-CUTTER.

SPECIFICATION forming part of Letters Patent No. 743,003, dated November 3, 1903.

Application filed March 4, 1903. Serial No. 146,083. (No model.)

*To all whom it may concern:*

Be it known that I, NEWTON LAMB, a citizen of the United States, residing at Yreka, in the county of Siskiyou and State of California, have invented certain new and useful Improvements in Bolt-Cutters, of which the following is a specification.

This invention relates to both cutters or trimmers.

The object of the invention is to produce a tool which may be handled in any position, and which shall be able to cut or trim a bolt close to the nut or plate from which it projects, and which shall have increased lever-power for cutting through the thicker part of the bolt.

The invention consists in certain constructions and combinations of mechanical elements, substantially as hereinafter claimed.

Figure 1 is an elevation from the back or frame side of the bolt-cutter with handles broken away. Fig. 2 is a reverse or face view of the jaws and connected parts. Fig. 3 is an edge view.

The numeral 1 indicates a frame, which has a longitudinal mortise 2 and pivot-holes 3 3 and 4 4. This frame has a notched end at 5 and shoulders on the cutting-jaws enter this notch. The frame may be of metal, either cast or forged. The cutting-jaws 6 6 are pivoted on pins passing through holes 3 3. The jaws are offset or shouldered, so that their lever-arms 7 7 lie alongside the frame 1, while the shoulders 8 8 enter notch 5. The jaws are beveled to cutting edges in the plane of the lower face of the frame, as shown clearly in Fig. 2. The pivots or rivets 9 9 pass through the jaws and frame and also through stay-plate 10. This plate 10 is complementary to the frame and the jaws are between the frame and stay-plate. The pivots 9 may be held in place by riveting or upsetting the ends or otherwise, as is common. Frame-plate 1 may be duplicated and plate 10 omitted. The outer ends of jaws 6 are connected to links 12 by pivots 11. These links 12 have knuckles at their outer ends, which embrace and by which they are connected to the jaws, the pivots 11 passing through the jaws and knuckles. Both links 12 are connected to the head 15 of sliding track 16. The links are offset, so that a single pivot 17 may connect both links to the head of the rack. The head of the rack is squared, so as to slide lengthwise in the mortise 2, before referred to. The rack 16 when moved lengthwise in said mortise acts on the ends of links 12 to either open or close the jaws 6. The position of the parts in Fig. 1 indicates this adjustment. The rack-bar 16 has teeth on each side. The handle-levers 20, pivoted to the frame by pivots 21, have segmental racks 22 engaging the sides of this rack-bar 16. Thus when the outer ends of handles 20 are spread apart the rack is drawn back from the jaws, the inner ends of links 12 partake of the movement, and the jaws are spread, as in Fig. 1. The closing of the handles causes the jaws to close with great force, the segment-gears acting to move the rack longitudinally and the links acting as toggle-levers to work the jaws. The offset shoulders at 8 on the cutting-jaws serve to bring the cutting edges close to the work and also permit the frame to lie close to the jaws, so as to support them as closely as possible to the point of actual strain.

This construction is quite strong and simple and affords great facility for the use of the tool in trimming bolts and for like purposes.

What I claim is—

1. The combination with the mortised frame, of a sliding head in said frame, links connected to said head and to the jaws, pivoted jaws on the frame, and means for moving the head lengthwise of the frame.

2. The combination of the mortised frame, a rack-bar having a squared head sliding in the mortise, links pivoted to the sliding head, jaws pivoted to the frame and to the links, and handles having segmental racks engaging the rack-bar.

3. The combination of the frame notched at its end, and longitudinally slotted, of the jaws pivoted to the frame and having shoulders entering the notch in the frame, a head moving in the longitudinal slot in the frame, links pivotally connected to the jaws and to the head, and means for moving the head lengthwise of the frame.

4. The mortised frame, a longitudinally-sliding head in said mortise, a rack-bar connected to said head, pivoted handles having segmental racks engaging the rack-bar, and a pair of jaws operatively connected by pivoted links to the sliding head, all combined.

In testimony whereof I affix my signature in presence of two witnesses.

NEWTON LAMB.

Witnesses:
  T. J. REED,
  A. P. McCARTON.